United States Patent
Lee

(10) Patent No.: US 7,404,833 B2
(45) Date of Patent: Jul. 29, 2008

(54) ROTARY PULSE TYPE FILTER DUST COLLECTOR

(76) Inventor: Chang Un Lee, 116-201 Hwakok Daewoo G.W. Apt, 1091 Hwakok-Dong, Kangseo-Ku, Seoul 157-013 (KR)

( * ) Notice: Subject to any disclaimer, the term of this patent is extended or adjusted under 35 U.S.C. 154(b) by 309 days.

(21) Appl. No.: 10/552,839

(22) PCT Filed: May 21, 2004

(86) PCT No.: PCT/KR2004/001220

§ 371 (c)(1),
(2), (4) Date: Oct. 13, 2005

(87) PCT Pub. No.: WO2004/103527

PCT Pub. Date: Dec. 2, 2004

(65) Prior Publication Data

US 2007/0039290 A1 Feb. 22, 2007

(30) Foreign Application Priority Data

May 21, 2003 (KR) .................. 10-2003-0032395

(51) Int. Cl.
*B01D 39/00* (2006.01)
*B01D 45/00* (2006.01)
*B01D 41/00* (2006.01)
(52) U.S. Cl. ............... 55/283; 95/268; 96/427
(58) Field of Classification Search .............. 55/302, 55/283; 95/268; 96/427, 426
See application file for complete search history.

(56) References Cited

U.S. PATENT DOCUMENTS

| 4,293,320 A | * | 10/1981 | Robinson | 96/427 |
| 4,367,080 A | * | 1/1983 | Kordas | 55/302 |
| 5,116,395 A | * | 5/1992 | Williams | 96/426 |
| 6,905,533 B2 | * | 6/2005 | Becker et al. | 95/268 |

FOREIGN PATENT DOCUMENTS

| EP | 95354 | 11/1983 |
| JP | 06287926 | 10/1994 |
| JP | 08229334 | 9/1996 |
| JP | 1119444 | 1/1999 |
| JP | 2002224521 | 8/2002 |

* cited by examiner

*Primary Examiner*—Walter D. Griffin
*Assistant Examiner*—Amber Miller-Harris

(57) ABSTRACT

The present invention discloses a rotary pulse type filter dust collector, which can maintain excellent de-dusting efficiency of a low pressure pulse type filter dust collector, reduce the number of required components in order to reduce manufacturing costs, maintenance fees, and lower defect factors to provide higher reliability. The dust collector includes: a dust collector body, a number of filter bags, a moving compressed air tank, nozzles, diaphragm valves, mechanical 3-way valves, protrusions, a reduction motor and a mechanical device for driving the compressed air tank, and an inverter controller.

8 Claims, 12 Drawing Sheets

ROTARY PULSE TYPE FILTER DUST COLLECTOR

TECHNICAL FIELD

The present invention relates to an industrial filter dust collector, and more particularly, to a rotary pulse type filter dust collector (hereinafter, referred to as 'rotary pulse type dust collector'), which can maintain excellent de-dusting efficiency of a low pressure pulse type filter dust collector using the air of low pressure (0.5 kgf/cm$^2$) for pulse, reduce the number of required components in order to reduce manufacturing costs and maintenance fees, and lower defect factors to improve reliability.

BACKGROUND ART

In general, filter dust collectors are installed on equipments, such as a boiler and an incinerator, which generate dust, installed inside a flour mill, a feed manufacturing factory, a cement manufacturing factory, or the likes. The installed filter dust collectors collect particle type materials such as dust, unburned carbon, and the likes, and remove or recover the collected particles.

For instance, as shown in FIG. 1, a conventional dust collector includes a dust collector body 100 having a cover 105, an intermediate plate 112 formed in a longitudinal direction inside the dust collector body 100, and a number of filter bags 110 formed along the longitudinal direction of the dust collector body 100 from the lower portion of the intermediate plate 112. Furthermore, a number of venturi tubes 115 corresponding to the filter bags 110 are mounted on the upper portion of the intermediate plate 112.

Nozzle pipes 120 are arranged above the venturi tubes 115 in parallel with the intermediate plate 112. A number of solenoid valves 130 are mounted on ends of the nozzle pipes 120 exposed to the outside of the dust collector body 100, and a compressed air tank 140 is mounted on the outer surfaces of the nozzle pipes 120. Furthermore, a timer (or time kit) 150 is mounted on the outer surface of the dust collector 100.

The dust collector shown in FIG. 1 usually uses high-pressure compressed air of 5~6 kgf/cm$^2$ as pulse air, but cleaning effect is not sufficient due to weak pulse. Therefore, designing engineer should apply very low air-to-cloth ratio, and so, the dust collector gets bigger due to increase of the number of the filter bags 110. Moreover, the conventional dust collector has a disadvantage in that the filter bags 110 are quickly blocked since condensed water and oil are mixed with the high-pressure compressed air used for generating pulse.

Meanwhile, a dust collector using very low pressure air (0.5 kgf/cm$^2$) to generate pulse is also disclosed. As shown in FIG. 2, the dust collector includes a number of filter bags 210 attached on an intermediate plate within a dust collector body 200 in a longitudinal direction, an air inlet 220 formed in an area of the outer surface of the dust collector body 200 to introduce the air, an air outlet 230 formed in the other area of the dust collector body 200 to discharge filtered air, and a compressed air tank 250 disposed inside a machine room 205 located above the filter bags 210, differently from the dust collector shown in FIG. 1.

The compressed air tank 250 has nozzles 260 of the same number as the filter bags 110 to pass the compressed air tank 250 vertically, and diaphragm valves 270 are mounted on the upper end of each nozzles 260. The compressed air tank 250 is connected with a compressed air source (a ring blower, a roots blower or air decompressed by a pressure reducing valve) and with a safety valve 240.

In this way, excellent cleaning effect can be obtained by generating very strong pulses with low pressure air (0.5 kgf/cm$^2$) having less condensed water and oil. However, the conventional low pressure pulse type dust collector has several disadvantages in that it requires a lot of very expensive components and increases manufacturing costs and maintenance fees because it needs one nozzle and one diaphragm valve for each filter bag and the plurality of solenoid valves (not shown, and ⅓~¼ of the number of the filter bags 210) are needed to generate a pulse by group of three or four diaphragm valves 270, the timer (or time kit, not shown) to send signal to the solenoid valves to control pulsing interval must be mounted.

DISCLOSURE OF THE INVENTION

To solve the above problems, the inventor of the present invention has a dust collector, which provides efficiency more excellent than the dust collector of FIG. 1, which is simpler than the low pressure air dust collector of FIG. 2, thereby considerably reducing manufacturing costs and maintenance fees and increasing reliability by reducing troublesome factors to break down.

The rotary pulse type dust collector according to the present invention materializes a simplified low pressure air pulsing system to pulse while the air tank is moving, and so, reduces the number of the nozzles and diaphragm valves, which have the same number as the filter bags to pulse each filter bags, to ⅙~⅒ or less. Furthermore, the present invention uses simplified mechanical 3-way valves in place of the solenoid valves, and uses an inverter controller to control the revolution speed of a reduction motor moving the compressed air tank instead of the timer which consists of a complicated electric circuit mounted to control the length and the interval of the pulses.

Accordingly, it is an object of the present invention to provide a rotary pulse type dust collector, which can maintain the excellent cleaning effect of the low pressure dust collector shown in FIG. 2, but simplifies the structure for generating pulses, thereby reducing manufacturing costs and a defect rate for easy maintenance, and allowing easy replacement of the filter bags.

Another object of the present invention is to provide a rotary pulse type dust collector, which allows the filter bags of the low pressure dust collector to be changed at the upper portion or the lower portion of the intermediate plate thereof.

To achieve the above objects, the present invention provides a rotary pulse type filter dust collector comprising: a dust collector body having an intermediate plate; a number of filter bags arranged vertically in the dust collector body; a compressed air tank located inside a machine room formed on the intermediate plate, and movably mounted above the intermediate plate by means of driving means, the compressed air tank receiving compressed air introduced from the outside; a number of nozzles perforating the compressed air tank; diaphragm valves connected to the nozzles respectively and correspondingly; mechanical 3-way valves for driving the plurality of nozzles and diaphragm valves of the compressed air tank by predetermined groups in order to clean the corresponding filter bags, the mechanical 3-way valves of the same number as the groups being mounted in the compressed air tank; a number of protrusions formed on the inner walls of the machine room to change the air flow direction of the 3-way valves by pressing manipulation levers of the 3-way valves; a reduction motor and a mechanical transmission device for driving the compressed air tank; and an inverter controller for controlling a cleaning interval of the dust collector by controlling the rotational speed of the driving means.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

Figure 1:
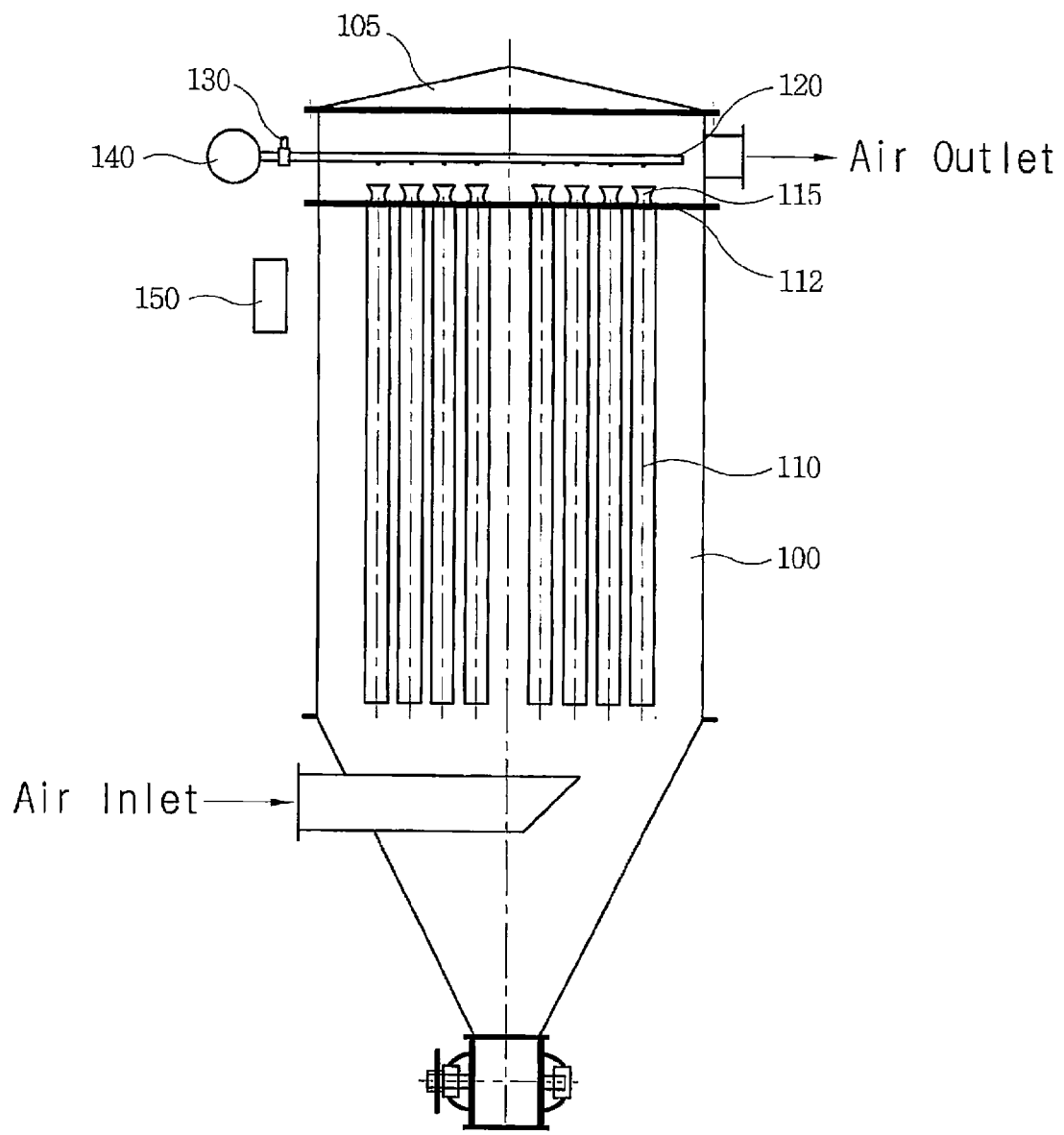
FIG. 1 is a side view of a conventional dust collector.
Figure 2:
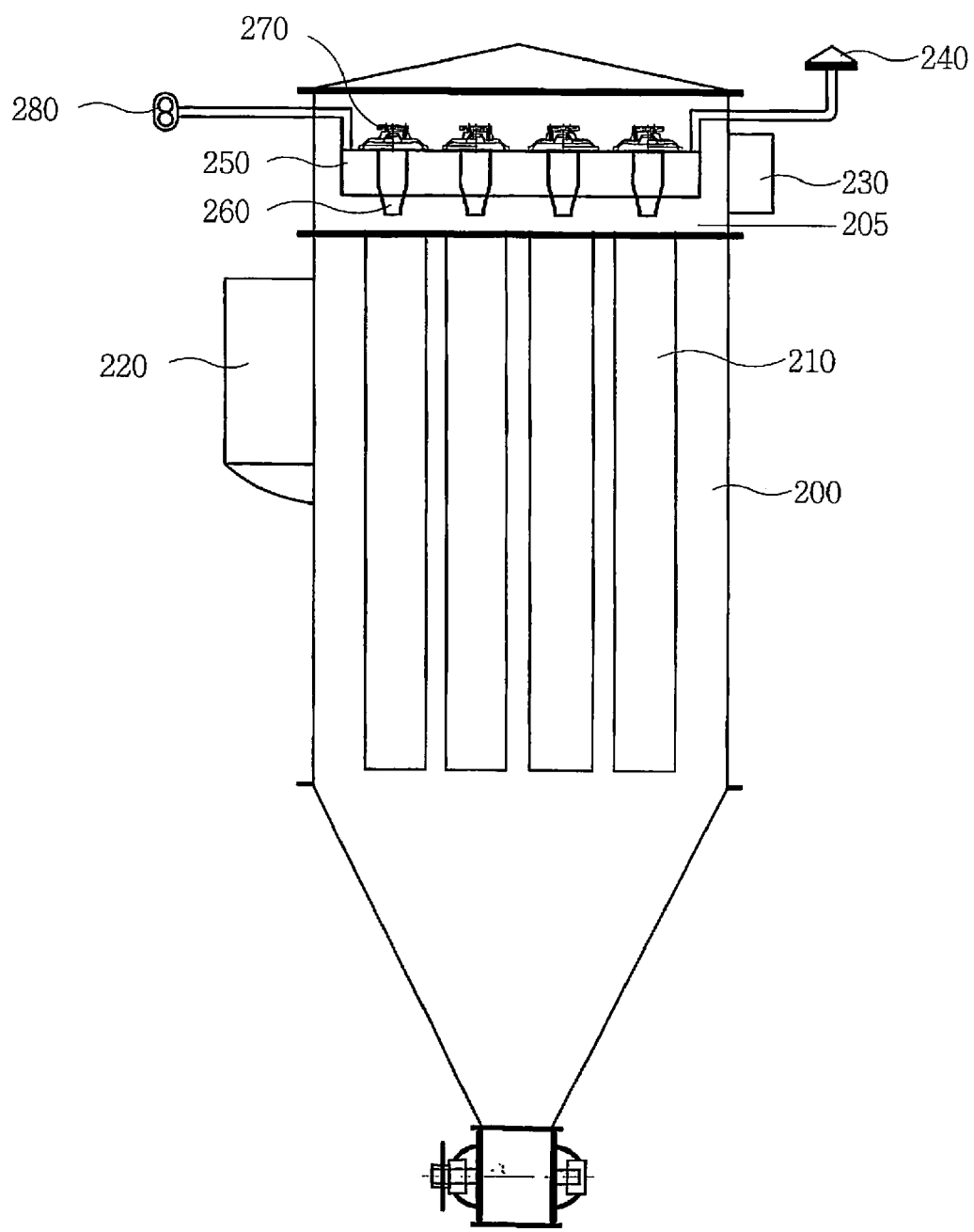
FIG. 2 is a side view of another conventional dust collector pulsing with low pressure air.

The present invention will now be described in detail in connection with preferred embodiments with reference to the accompanying drawings.

The rotary pulse type filter dust collector according to the present invention may be formed in a round or rectangular shape according to a structure of a dust collector body having filter bags. The present invention will describe the round-shaped dust collector body case as the first embodiment, and the rectangular-shaped dust collector body case as the second embodiment.

Embodiment 1

FIGS. 3 to 8 are a first preferred embodiment of the present invention, and show a rounded dust collector body 10. In the first preferred embodiment, diaphragm valves 65 and nozzles 63 are mounted on a fan-shaped compressed air tank 40. When the diaphragm valves 65 and the nozzles 63 arrive at the corresponding filter bags 30 while the compressed air tank 40 is rotating, mechanical 3-way valves 67 instead of electric solenoid valves are used to generate pulses.

For example, in case of a conventional dust collector with 60 filter bags 30, the conventional dust collector requires 60 nozzles 63 and 60 diaphragm valves 65 for the 60 filter bags 30, but the present invention can be operated only by 10 nozzles 63 and 10 diaphragm valves 65, which are ⅙ of the number of the nozzles and diaphragm valves mounted on the conventional dust collector.

Furthermore, the present invention adopts simplified mechanical 3-way valves 76 instead of 20 electric solenoid valves, and an inverter controller 61 for controlling speed of a reduction motor 55 rotating the compressed air tank 40 instead of the expensive electric timer for sending signals to the solenoid valves to control pulsing interval.

Therefore, the present invention can maintain the excellent pulse function of the low pressure type dust collector, but reduce the number of required components, manufacturing costs and maintenance fees, and improve reliability.

Hereinafter, the present invention will be described in more detail as follows.

Figure 3:
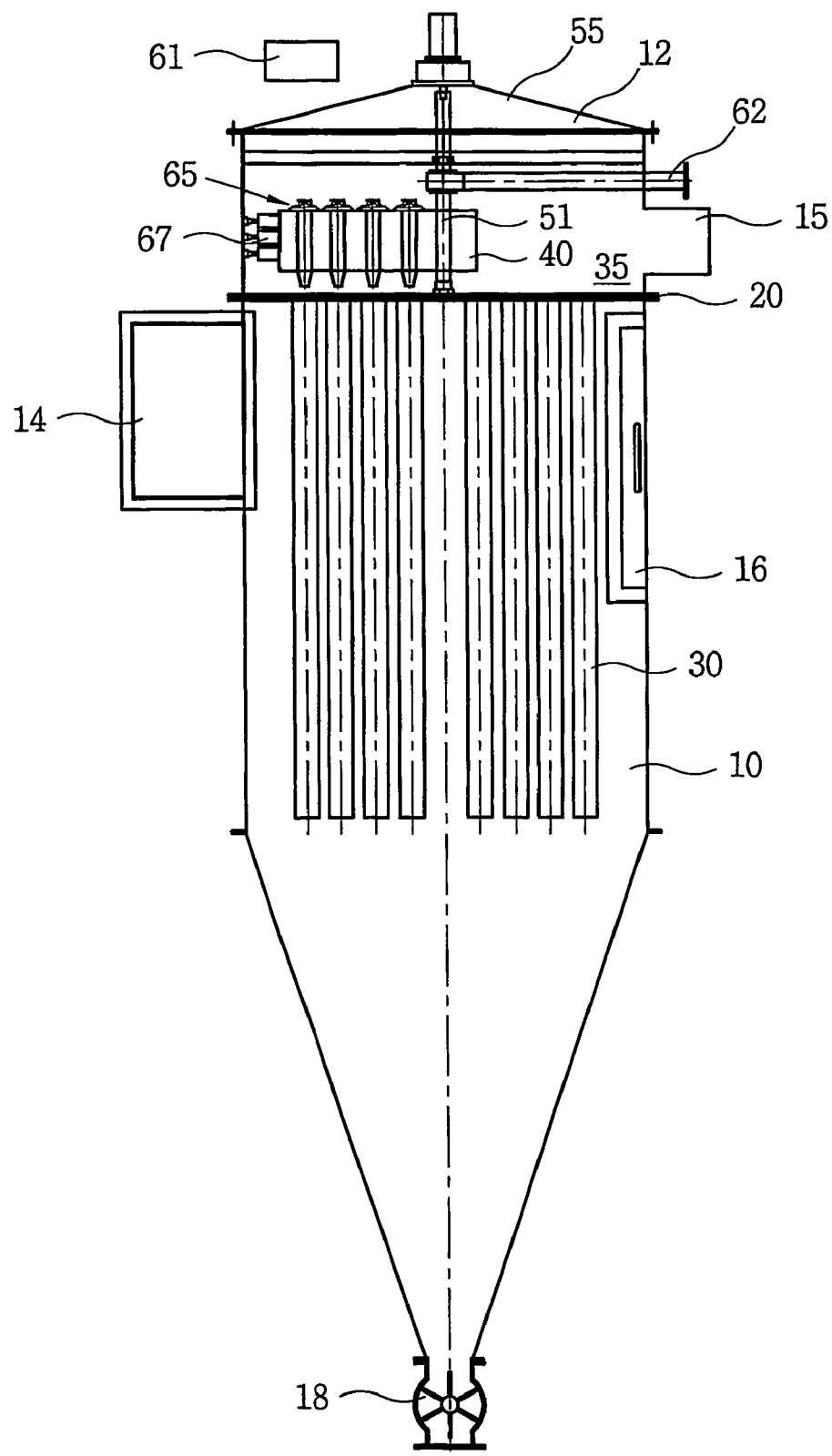
FIG. 3 is a side view of a rotary pulse type dust collector according to a first preferred embodiment of the present invention.

As shown in FIG. 3, the rotary pulse type dust collector according to the first preferred embodiment of the present invention includes the dust collector body 10, the plurality of the filter bags 30 arranged on an intermediate plate 20 mounted inside the dust collector body 10 vertically, and the fan shaped compressed air tank 40 disposed inside a machine room 35 located above the filer bags 30.

The dust collector body 10 has a cover 12 formed on the upper portion thereof, and an airlock 18 mounted on the lower end thereof.

The dust collector body 10 further includes an air inlet 14 formed in a portion of the outer surface thereof to introduce the dust laden air, a clean air outlet 15 formed in the other portion to discharge filtered air, and an inspection door 16 mounted on a side thereof.

A bearing 53 for supporting the lower portion of the shaft 51, which is a rotating center of the compressed air tank 40, is mounted at the center of the intermediate plate 20, and another bearing 53 for supporting the upper portion of the shaft 51 is mounted at the center of a supporting rod traversing the machine room 35, so that the compressed air tank 40 can rotate on the shaft 51 supported by the two upper and lower bearings 53 if rotational force is provided to the shaft 51.

As driving means for rotating and driving the compressed air tank 40, the reduction motor 55 can be used. As shown in FIG. 3, the reduction motor 55 can be coupled on the upper portion of the shaft 51, or as shown in FIG. 4, mounted on the outer surface of the dust collector body 10.

Figure 4:
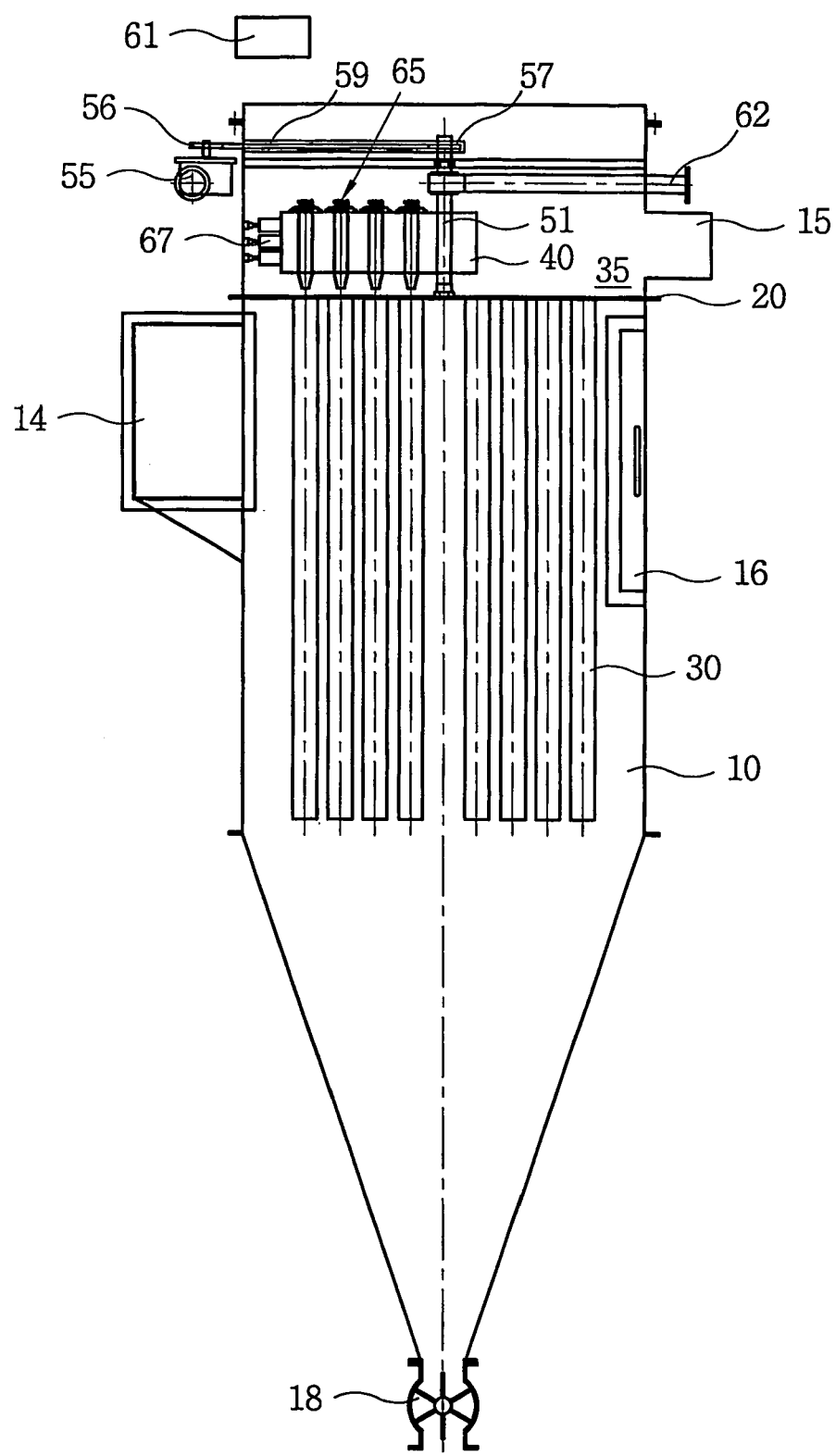
FIG. 4 is a view of a modification of the rotary pulse type dust collector according to the first preferred embodiment of FIG. 3.

Based on the position of the reduction motor 55, the structure of FIG. 3 could be called a "top driving type", and the structure of FIG. 4 could be called a "side driving type".

As shown in FIG. 3, in case of the top driving type, the reduction motor 55 is directly coupled on the upper portion of the shaft 51. However, as shown in FIG. 4, in case of the side driving type, a driving sprocket 56 is mounted on the reduction motor 55, and a driven sprocket 57 is mounted on the shaft 51 of the compressed air tank 40, and then, the driving sprocket 56 and the driven sprocket 57 are connected with each other by means of a chain 59. At this time, since the rotational speed of the compressed air tank 40 is determined by the reduction motor 55, the rotational speed of the reduction motor 55 is controlled by the inverter controller 61 in order to control the pulsing interval as desired.

Hereinafter, the first preferred embodiment of the present invention will be described based on the side driving type dust collector of FIG. 4 where the reduction motor 55 is mounted on the outer surface thereof.

Figure 5:
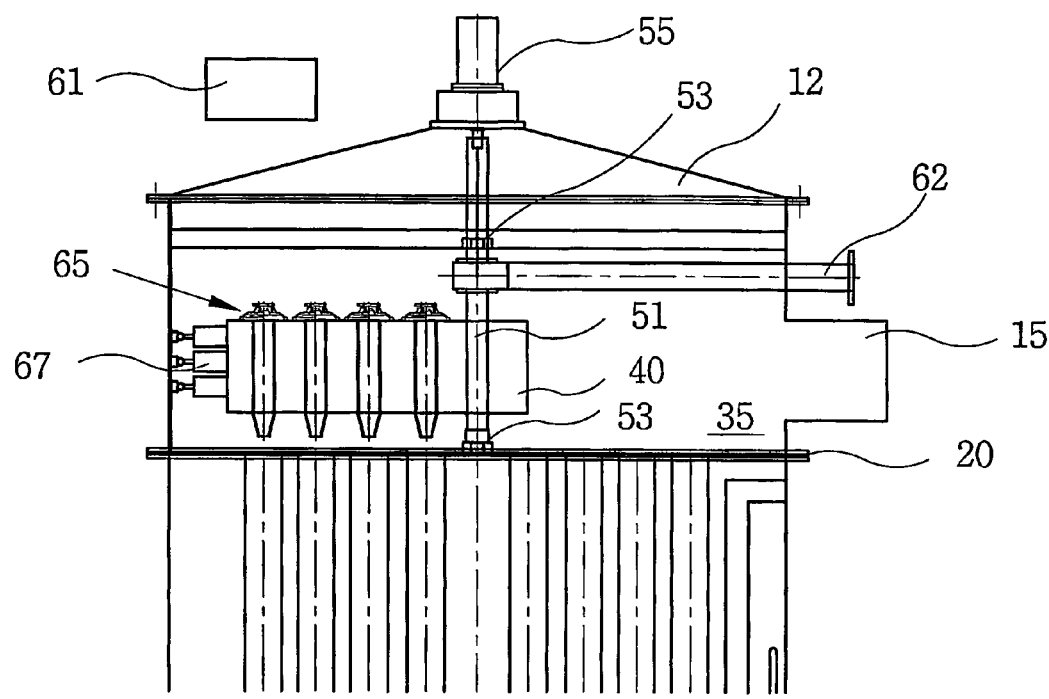
FIG. 5 is a partially enlarged view of FIG. 3.
Figure 6:
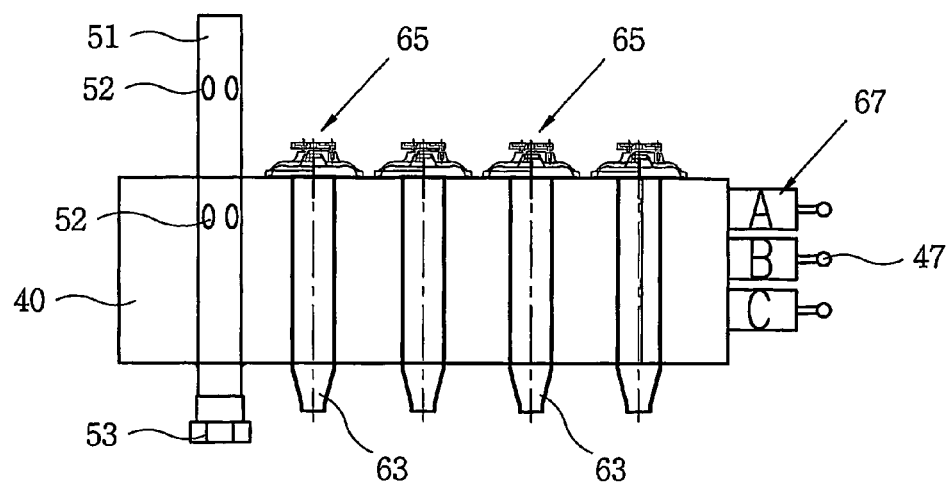
FIG. 6 is an enlarged view of essential parts of FIG. 5.

As shown in FIGS. 5 and 6, the compressed air tank 40 has the plurality of nozzles 63 vertically passing the compressed air tank 40, and the diaphragm valves 65 are mounted above the nozzles 63. In addition, the three mechanical 3-way valves 67 are mounted on the circumferential surface of the compressed air tank 40.

An induction pipe 62 has an end connected to the shaft 51, and the other end exposed to the outside of the dust collector in order to introduce compressed air. The shaft 51 has a number of air holes 52 formed in a portion protruding to the outside of the compressed air tank 40 and a portion contained in the compressed air tank 40. Therefore, the compressed air is induced into the induction pipe 62 through an inlet of the induction pipe 62, and then, introduced into the compressed air tank 40 through the air holes 52 formed in the shaft 51.

Figure 7:
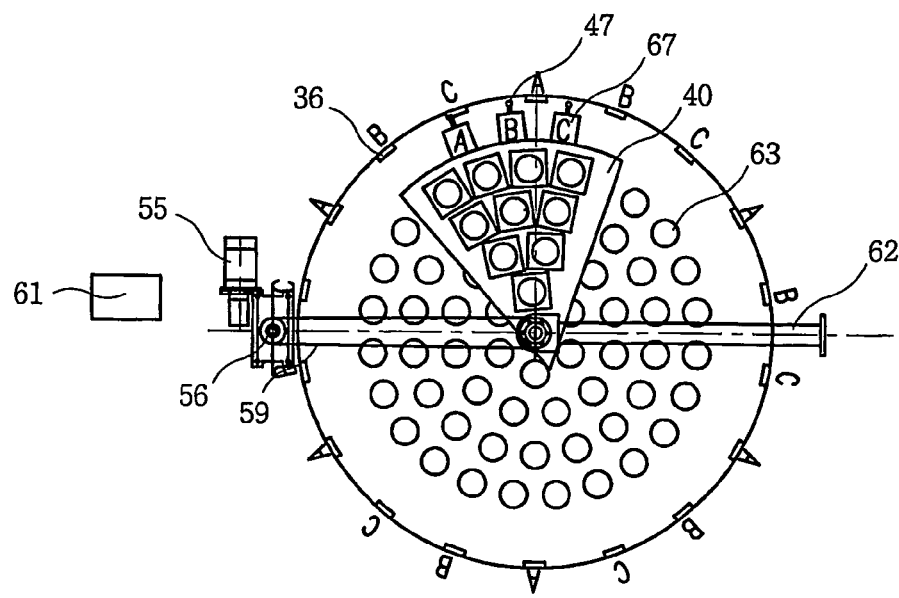
FIG. 7 is a plan view of the rotary pulse type dust collector of FIG. 4.
Figure 8:
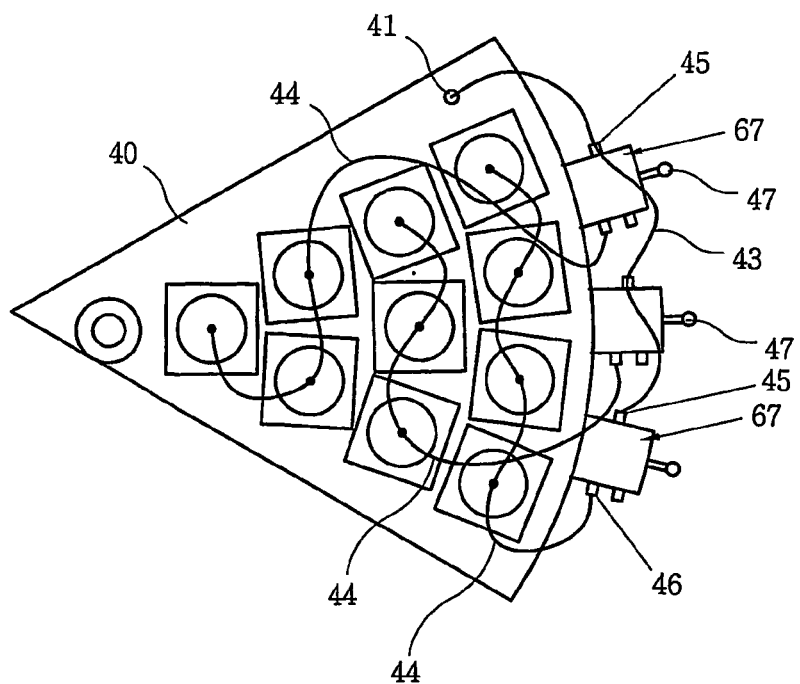
FIG. 8 is an enlarge view of essential parts of FIG. 7.
Figure 9A:
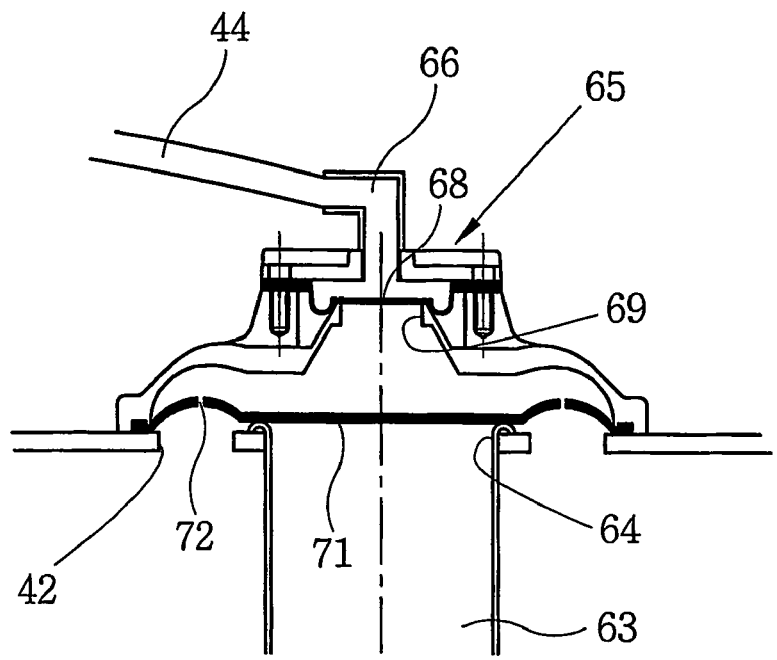
FIGS. 9a to 9d are views for explaining an operation process in an area of diaphragm valves.

As shown in FIGS. 7, 8 and 9a, the compressed air tank 40 has a through hole 41. The through hole 41 is directed to a valve entrance hole 45 of the 3-way valve 67 through a first air hose 43. The compressed air introduced into the valve entrance hole 45 comes out through a valve exit hole 46 in a normal condition, and arrives at a nipple 66 formed on the diaphragm valve 65 through a second air hose 44.

Then the first diaphragm 68 mounted inside the diaphragm valve 65 is swollen up and an air inlet 69 is closed as shown in FIG. 9a.

Then, the compressed air is introduced into a hole 42 formed in the compressed air tank 40 below a second diaphragm 71, and fills the upper portion of the second diaphragm 71 after being introduced through a fine hole 72 formed in the second diaphragm 71, so that the second diaphragm 71 is kept in a state where it closes the upper portion of an air entrance 64 of the nozzle 63 as shown in FIG. 9a (hereinafter, called the normal condition).

In the above state (see FIG. 9a), After the compressed air tank 40 is rotated, when the manipulation lever 47 is pressed while passing above the protrusion 36, which is formed on the inner wall of the machine room 35, in contact with the protrusion 36, and thereby, an air flow path of the 3-way valve 67 is changed, the first air hose 43 is closed, and the second air hose 44 is opened, so that pressure swelling up the first diaphragm 68 is released.

Figure 9B:
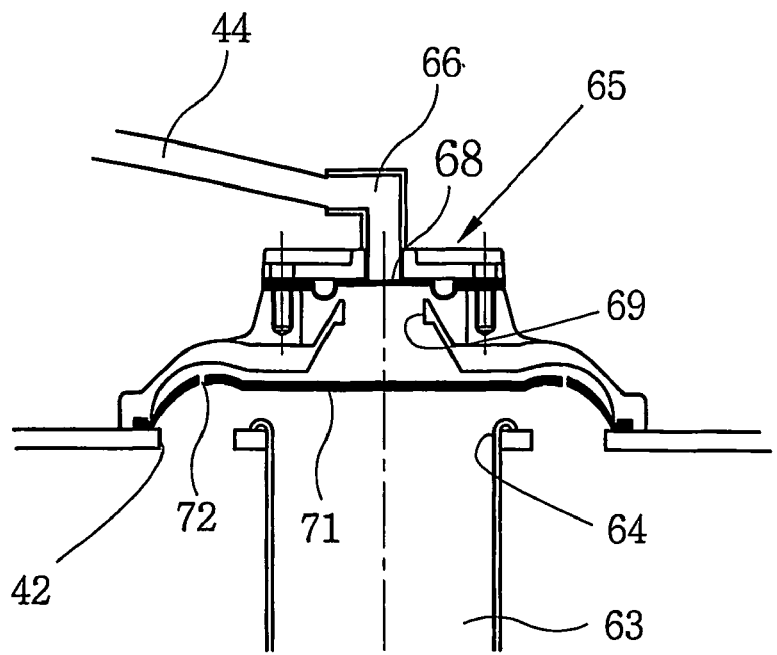

As a result, the air inlet 69 is opened, and the pressure filling up the upper portion of the second diaphragm 71 is removed. Therefore, as shown in FIG. 9b, the second diaphragm 71 is lifted up and in a pulsed condition by pressure acting to the lower portion of the diaphragm 71, and then, the compressed air ascended through the hole 42 of the compressed air tank 40 is blown into the nozzle 63. While the air flows inside a narrow path formed at an end portion of the nozzle 63, the speed of the air exceeds the velocity of sound and brings out strong pulse (hereinafter, called a pulsing condition).

While the compressed air tank 40 is continuously rotated, when the manipulation lever 47 of the 3-way valve 67 escapes from the protrusion 36 of a short length mounted on the inner wall of the machine room 35, the air flow direction of the 3-way valve 67 is changed, and the dust collector is in the normal condition as shown in FIG. 9a.

The three, four or five diaphragm valves 65, which are one of diaphragm valve groups, pulse as the same times as the number of the protrusions 36 inside the machine room 35 while the compressed air tank 40 rotates one round.

In case of the dust collector according to the first preferred embodiment, as shown in FIGS. 7 and 8, for example, after ten nozzles 63 are arranged in the compressed air tank 40, six protrusions 36 of an "A" group are arranged inside the machine room 35 in contact with three 3-way valves 67 of the "A" group at intervals of 60°, and six protrusions 36 of a "B" group are arranged in contact with three 3-way valves 67 of the "B" group at 20° ahead from the "A" group protrusions. In the same way, six protrusions of a "C" group is arranged in contact with three 3-way valves 67 at intervals of 60° at 20° ahead from the "B" group protrusions.

In the above state, when the compressed air tank 40 is rotated one round, the manipulation levers 47 of the 3-way valves 67 located in the "A", "B" and "C" groups pulse whenever they contact the six protrusions 36 of each group, and then, continuously clean the 60 filter bags 30 arranged under the compressed air tank 40.

The cleaning interval can be easily adjusted by controlling the rotational speed of the reduction motor 55 using one inverter controller 61. By the above structure and function, the same principle as the above can be applied to dust collectors having more or less than 60 filter bags 30.

Embodiment 2

Figure 10:
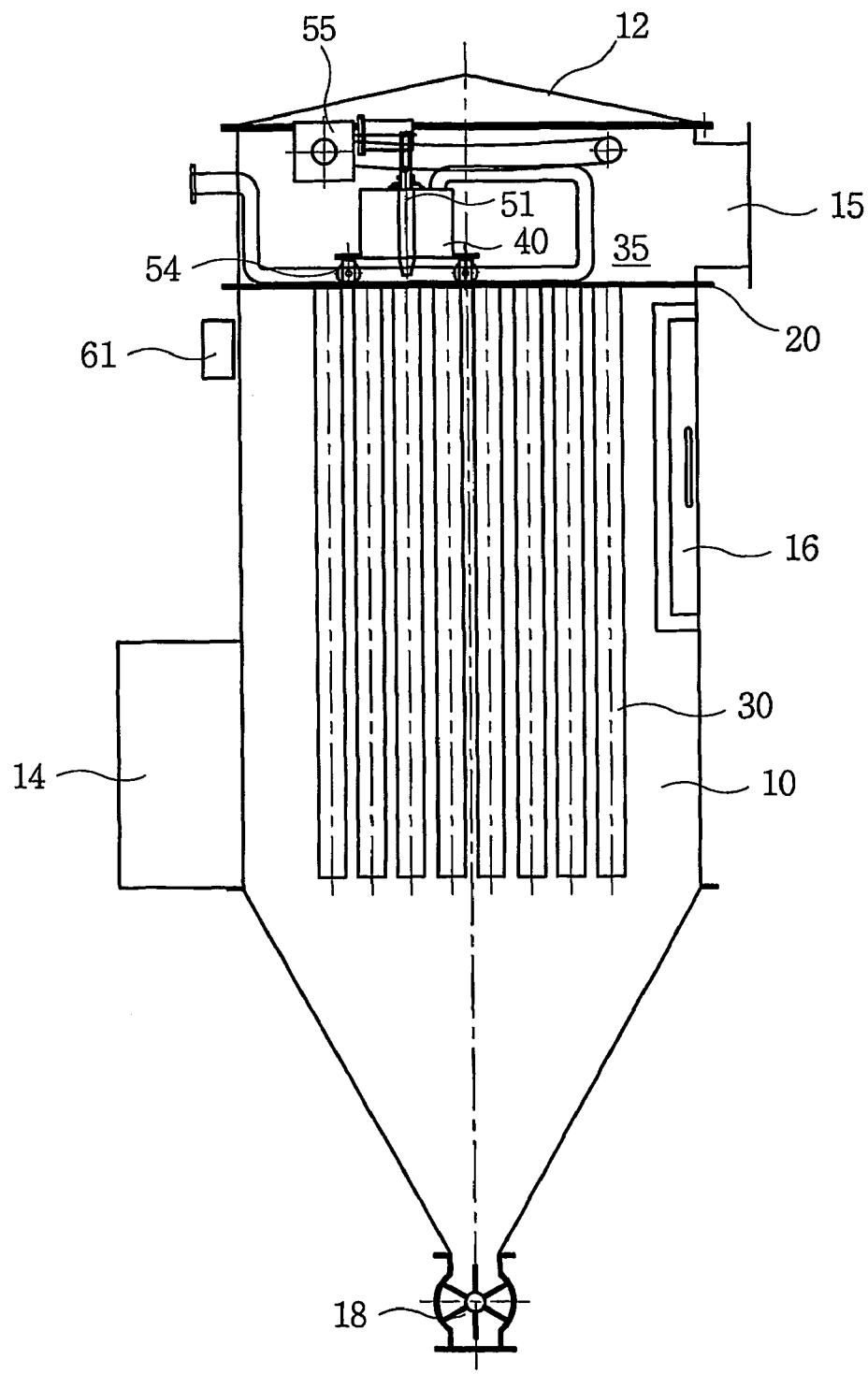
FIG. 10 is a side view of a rotary pulse type dust collector according to a second preferred embodiment of the present invention.
Figure 11:
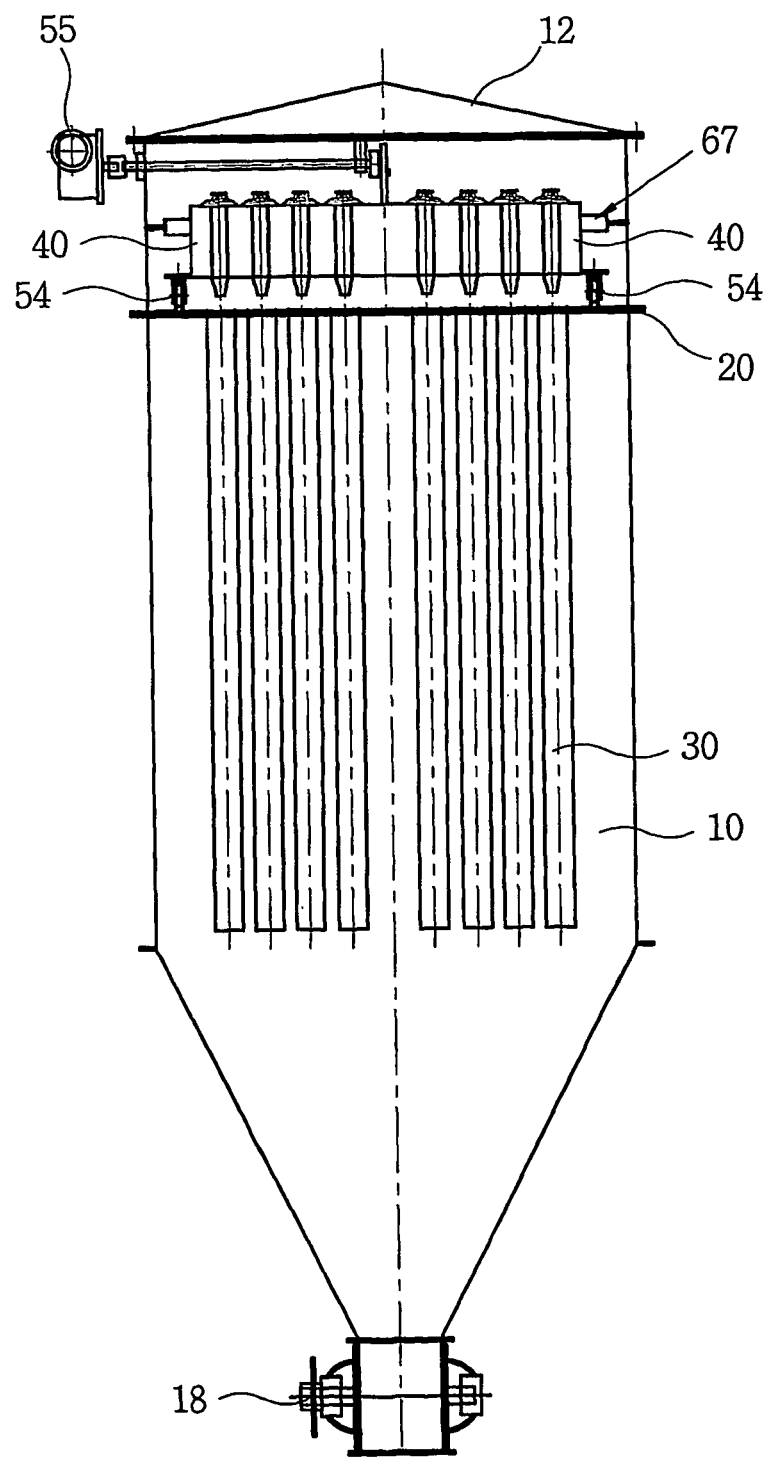
FIG. 11 is a front view of the rotary pulse type dust collector of FIG. 10.
Figure 12:
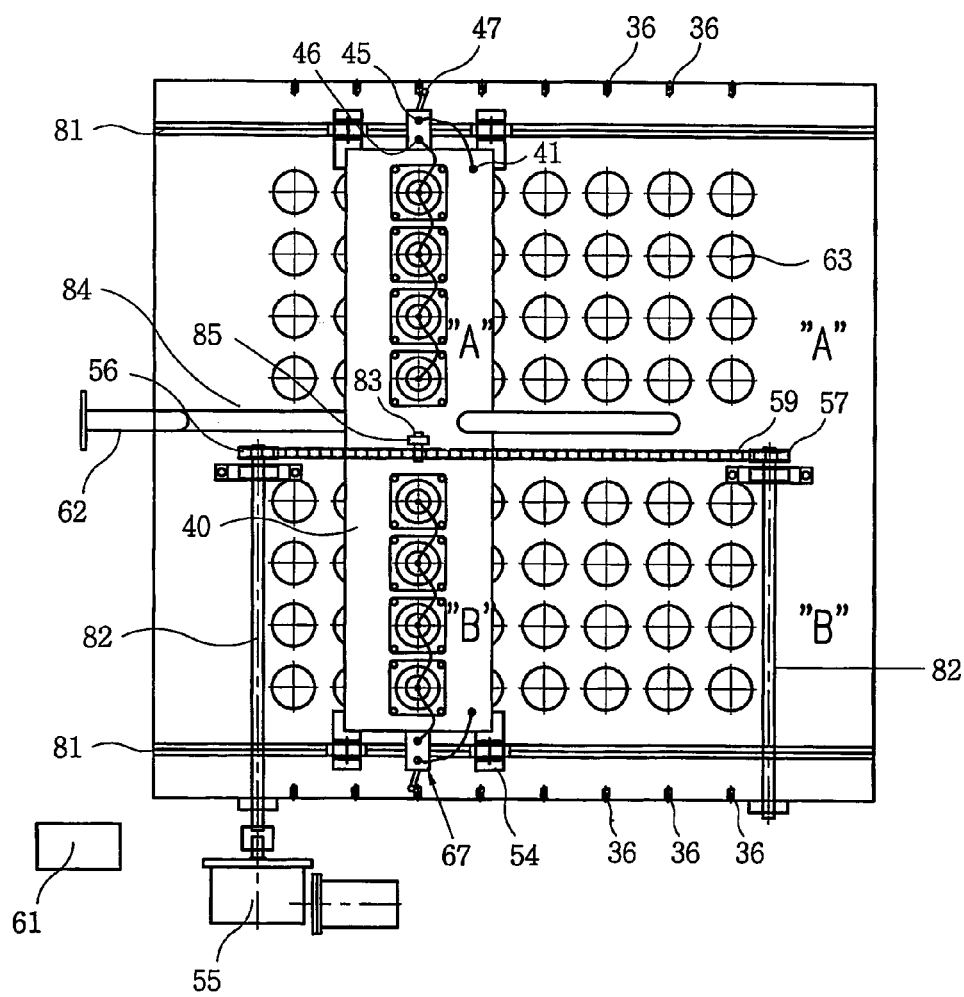
FIG. 12 is a enlarged plan and side view of the rotary pulse type dust collector of FIG. 10.
Figure 13:
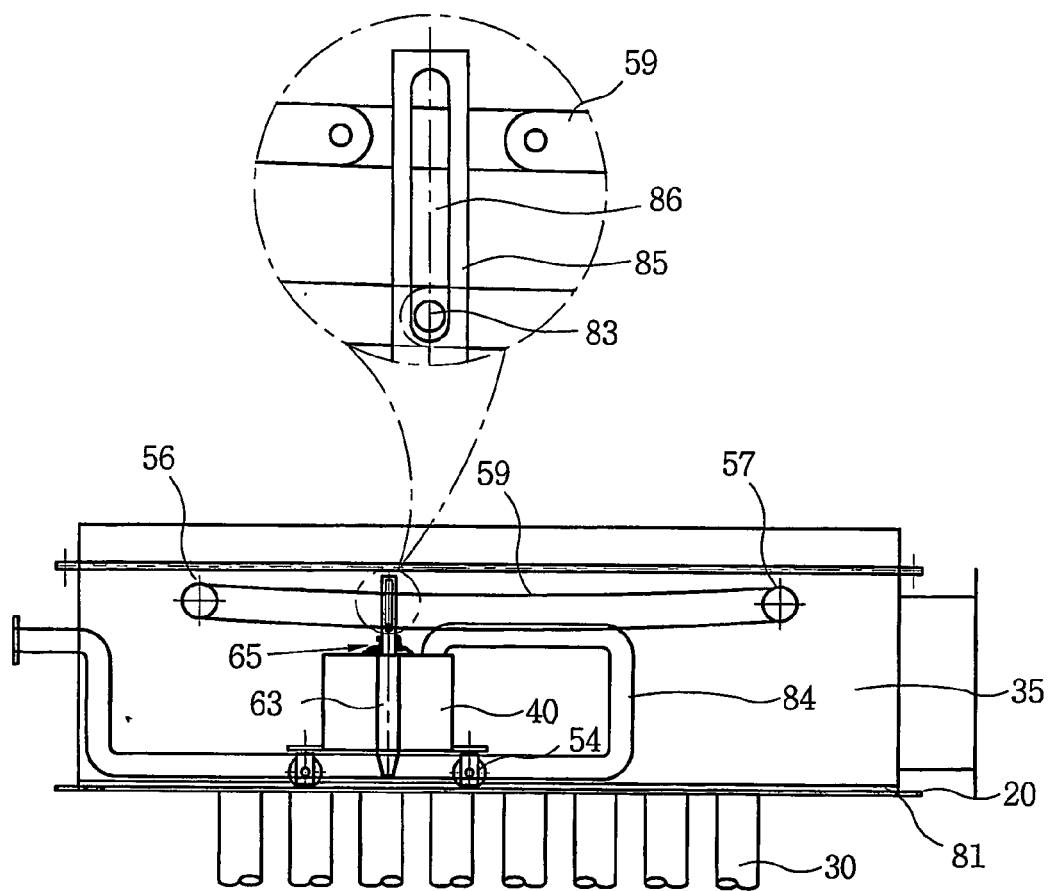
FIG. 13 is an enlarged view of essential parts of FIG. 12.

FIGS. 10 to 12 show a second preferred embodiment of the present invention, which is rectangular-shaped dust collector body 10. In the second preferred embodiment of the present invention, as the dust collector is in a rectangular-shape, for example, if 8 filter bags 30 are arranged in 8 rows, long rectangular-shaped compressed air tank 40 having 8 pairs of nozzles 63 and diaphragm valves 65 reciprocates above the filter bags 30. At this time, the compressed air tank 40 pulses and cleans four filter bags 30 eight times on an "A" part when passing above the filter bags 30, and pulses and cleans four filter bags 30 eight times on a "B" part when returning to its original position.

By repeating the above process, the compressed air tank 40 can clean all of the 64 filter bags 30. At this time, the dust collector according to the present invention uses eight pairs of nozzles 63 and diaphragm valves 65 instead of 64 pairs of nozzles 63 and diaphragms 65, two mechanical 3-way valves 67 instead of 20 solenoid valves, and the inverter controller 61 for controlling speed of the reduction motor 55 instead of the expensive electric timer, which was mounted for sending signals to the solenoid valves to control pulsing interval. As a result, the present invention can maintain the excellent effect of the low pressure pulse type dust collector as it is, reduce manufacturing costs and defect factors of the dust collector, and improve reliability.

Hereinafter, the structure of the dust collector will be described in more detail as follows.

As shown in FIGS. 10 to 12, the long rectangular-shaped compressed air tank 40 is mounted above the intermediate plate 20 of the dust collector body 10. Four wheels 54 are mounted at both sides of the lower portion of the compressed air tank 40, so that the compressed air tank 40 can freely reciprocate on a rail 81 mounted on the upper portion of the intermediate plate 20 by driving means.

The driving means includes the reduction motor 55, a driving shaft 82 connected to the reduction motor 55, the driving sprocket 56 connected to the driving shaft 82, the driven sprocket 57 opposed to the driving sprocket 56, and the chain 59 for connecting the driving sprocket 56 and the driven sprocket 57.

A rod 85 is vertically mounted at the center of the upper portion of the compressed air tank 40, and a protrusion 83 is formed on a side surface of the chain 59. The protrusion 83 formed on the chain 59 is inserted into an elongated vertical hole 86 of the rod 85 standing at the center of the compressed air tank 40.

Therefore, the rod 85 engaged with the protrusion 83 formed on the side surface of the chain 59 repeatedly performs actions for pushing and pulling the compressed air tank 40. At this time, the compressed air tank 40 can be moved at a desired speed by controlling the rotational speed of the reduction motor 55 using the inverter controller 61.

As described above, the nozzles 63 are mounted on the compressed air tank 40 in such a manner as to pass the compressed air tank 40 vertically, the diaphragm valves 65 are mounted on the nozzles 63, and two mechanical 3-way valves 67 are attached on both side walls of the compressed air tank 40. The compressed air is introduced into the induction pipe 62 through the inlet of the induction pipe 62, and fills the compressed air tank 40 by means of a flexible induction hose 84.

Figure 9C:
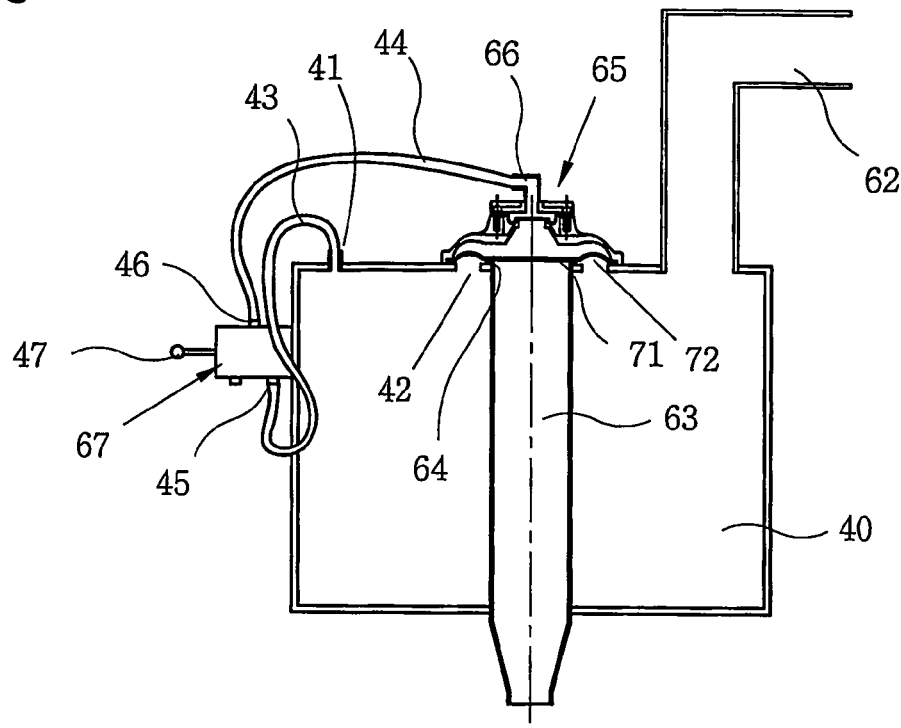
Figure 9D:
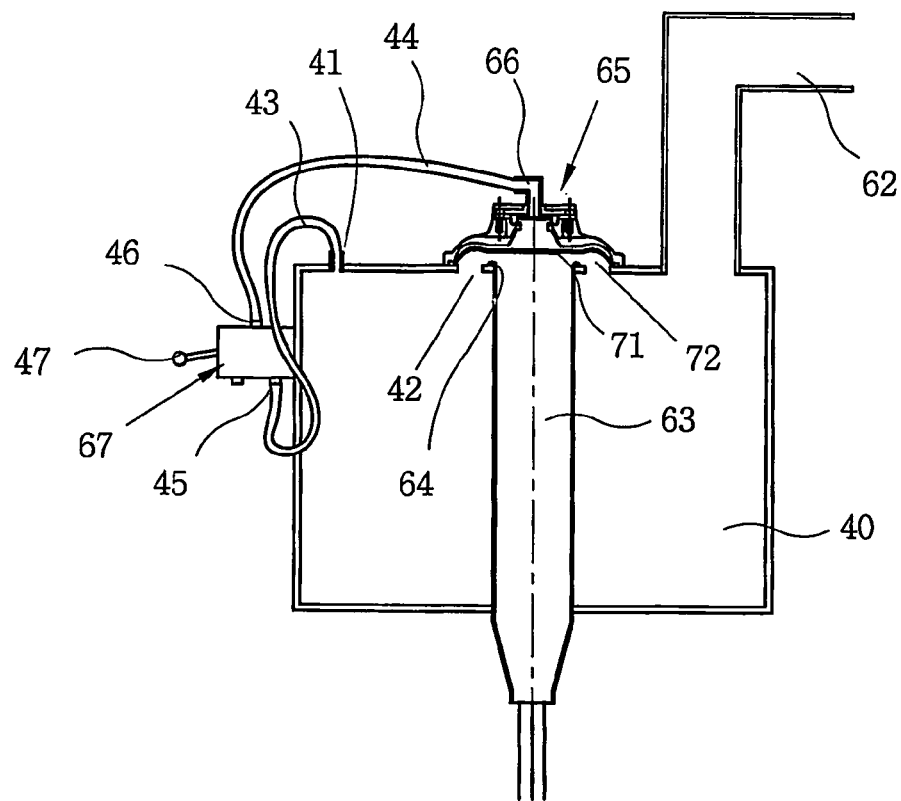

As shown in FIGS. 12, 9c and 9d, the compressed air tank 40 has two through holes 41, and the through holes 41 are directed to the entrance hole 45 of the 3-way valve 67 through the first air hose 43. The compressed air introduced into the entrance hole 45 is inducted through the exist hole 46 in the normal condition, and then, arrives at the nipple 66 formed on the diaphragm valve 65 through the second air hose 44.

However, while the compressed air tank 40 is moving, the manipulation lever 47 of the 3-way valve 67 mounted on the compressed air tank 40 is pressed by the protrusion 36 formed on the inner wall of the machine room 35, and then, the air flow direction of the 3-way valve 67 is changed. Of course, one side of the manipulation lever 47 is driven only in a forward direction and the other side is driven only in a rearward direction (one-way type is available on the market) by the protrusions 36 formed on both sides of the machine room 35.

As shown in FIG. 9c, in a state where the 3-way valve 67 is in the normal condition, when the compressed air is introduced through the through holes 41 of the compressed air tank 40 and arrives at the nipple 66 above the diaphragm valve 65 through the first air hose 43, the 3-way valve 67 and the second air hose 44, the first diaphragm 68 located inside the diaphragm valve 65 is swollen up, and then, the air inlet 69 is closed as shown in FIG. 9c.

Then, the hole 42 formed in the compressed air tank 40 below the second diaphragm 71 is filled with the compressed air, and then, the upper portion of the second diaphragm 71 is also filled with the compressed air as the compressed air is introduced into the second diaphragm 71 through the fine hole 72 formed in the second diaphragm 71, so that the second diaphragm 71 can continuously close the air entrance 64 formed in the upper portion of the nozzle 63 as shown in FIG. 9c.

In the above condition (see FIG. 9c), After the compressed air tank 40 is moved, when the manipulation lever 47 of the 3-way valve 67 is pressed while passing above the protrusion 36, which is formed on the inner wall of the machine room 35, in contact with the protrusion 36, and thereby, an air flow path of the 3-way valve 67 is changed, the first air hose 43 is closed, and the second air hose 44 is opened, so that pressure swelling up the first diaphragm 68 is removed. (FIG. 9d)

As a result, the air inlet 69 is opened, and the pressure filling up the upper portion of the second diaphragm 71 is removed. Therefore, as shown in FIG. 9d, the second diaphragm 71 is lifted up and in a pulsed condition by pressure acting to the lower portion of the diaphragm 71, and then, the compressed air introduced through the hole 42 of the compressed air tank 40 is blown into the nozzle 63. While the air flows inside a narrow path formed at an end portion of the nozzle 63, the speed of the air exceeds the velocity of sound and brings out strong pulse (hereinafter, called a pulsing condition).

While the compressed air tank 40 is continuously moving, when the manipulation lever 47 of the 3-way valve 67 escapes from the protrusion 36 of a short length mounted on the inner wall of the machine room 35, the air flow direction of the 3-way valve 67 is changed, and the dust collector is in the normal condition again as shown in FIG. 9c.

Therefore, the compressed air tank 40 can continuously reciprocate by only one reduction motor 55, and the filter bags 30 located below the compressed air tank 40 can be cleaned continuously. At this time, the cleaning interval can be adjusted by controlling the rotational speed of the reduction motor 55 using one inverter controller 61.

Changing bags is possible from both directions, from bottom after open the inspection door 16 and from top after open the cover 12 and lay the rod 85 down to disengage from the protrusion 83 and then the air tank could move freely.

INDUSTRIAL APPLICABILITY

As described above, the present invention can reduce the number of required components for the low pressure pulse type dust collector, which has excellent de-dust efficiency, reduce manufacturing costs, maintenance fees and defect factors, and improve reliability.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A rotary pulse type filter dust collector comprising:
   a dust collector body having an intermediate plate;
   a number of filter bags arranged vertically in the dust collector body;
   a compressed air tank located inside a machine room formed on the intermediate plate, and movably mounted above the intermediate plate by means of driving means, the compressed air tank receiving compressed air introduced from the outside;
   a number of nozzles perforating the compressed air tank;
   diaphragm valves connected to the nozzles respectively and correspondingly;
   mechanical 3-way valves for driving the plurality of nozzles and diaphragm valves of the compressed air tank by predetermined groups in order to clean the corresponding filter bags, the mechanical 3-way valves of the same number as the groups being mounted in the compressed air tank;
   a number of protrusions formed on the inner walls of the machine room to change the air flow direction of the 3-way valves by pressing manipulation levers of the 3-way valves;
   a reduction motor and an mechanical transmitting device for driving the compressed air tank; and
   an inverter controller for controlling a cleaning interval of the dust collector by controlling the rotational speed of the driving means.

2. The rotary pulse type filter dust collector according to claim 1, wherein the 3-way valve includes:
   a valve entrance hole for receiving compressed air from the compressed air tank;
   a valve exit hole for discharging the compressed air to a side of the diaphragm valve; and
   a manipulation lever for generating signals in contact with the protrusions to change it's air flow direction.

3. The rotary pulse type filter dust collector according to claim 1, wherein the compressed air tank is formed in a fan shape or a rectangular-shape according to the shape of the dust collector body.

4. The rotary pulse type filter dust collector according to claim 3, wherein if the compressed air tank is in the fan shape, the 3-way valve is located on the circumferential surface of the compressed air tank, and is in contact or not in contact with the protrusions formed on the inner walls of the machine room when the fan-shaped compressed air tank is rotated on the center of the intermediate plate.

5. The rotary pulse type filter dust collector according to claim 3, wherein if the compressed air tank is in a hexahedral shape, the 3-way valves are located on both side surfaces of the compressed air tank, and is in contact or not in contact with the protrusions formed on side surfaces of the machine room when the compressed air tank performs a reciprocating motion.

6. The rotary pulse type filter dust collector according to claim 1, wherein the driving means is arranged on the side surface or the upper portion of the machine room.

7. The rotary pulse type filter dust collector according to claim 6, wherein the driving means arranged on the side surface of the machine room includes:
   at least one wheel mounted on the lower end of the compressed air tank in a rolling way;
   a reduction motor;
   a driving shaft and a driving sprocket connected to the reduction motor;
   a driven shaft and a driven sprocket separated from the driving sprocket at opposite side;
   a chain for connecting the driving sprocket and the driven sprocket with each other; and
   a protrusion formed on the chain for driving the compressed air tank.

8. The rotary pulse type filter dust collector according to claim 4, 6, 7, wherein the inverter controller controls the cleaning interval by means of controlling the rotational speed of the reduction motor.

* * * * *